US011440175B2

(12) United States Patent
Lu et al.

(10) Patent No.: US 11,440,175 B2
(45) Date of Patent: Sep. 13, 2022

(54) MULTI-MODAL SENSING FOR POWER TOOL USER INTERFACE

(71) Applicant: INTERLINK ELECTRONICS, INC., Camarillo, CA (US)

(72) Inventors: Chee Wai Lu, Singapore (SG); Wai Jye Chan, Singapore (SG); Kok Keong Law, Singapore (SG); Cheng Seong Lee, Singapore (SG)

(73) Assignee: INTERLINK ELECTRONICS, INC., Camarillo, CA (US)

( * ) Notice: Subject to any disclaimer, the term of this patent is extended or adjusted under 35 U.S.C. 154(b) by 0 days.

(21) Appl. No.: 16/474,967

(22) PCT Filed: Jan. 3, 2018

(86) PCT No.: PCT/US2018/012265
§ 371 (c)(1),
(2) Date: Jun. 28, 2019

(87) PCT Pub. No.: WO2018/129100
PCT Pub. Date: Jul. 12, 2018

(65) Prior Publication Data
US 2019/0344421 A1   Nov. 14, 2019

Related U.S. Application Data

(60) Provisional application No. 62/442,349, filed on Jan. 4, 2017.

(51) Int. Cl.
*B25F 5/02* (2006.01)
*G01L 5/22* (2006.01)
(Continued)

(52) U.S. Cl.
CPC .................. *B25F 5/02* (2013.01); *G01L 5/22* (2013.01); *G08B 21/18* (2013.01); *B25B 21/00* (2013.01)

(58) Field of Classification Search
CPC ..... B25F 1/00; B25F 5/02; B25F 5/00; H02K 1/00; G01L 5/22; G08B 21/18; B25B 21/00; G06K 9/00355
See application file for complete search history.

(56) References Cited

U.S. PATENT DOCUMENTS 5,413,611 A * 5/1995 Haslam, II .............. A61F 2/583
623/24
8,805,028 B2   8/2014 Miura et al.
(Continued)

FOREIGN PATENT DOCUMENTS

EP   2808761 A1   12/2014
JP   2007-518582 A   7/2007
(Continued)

OTHER PUBLICATIONS

European Search Report issued in corresponding application No. 18735977.3, dated Sep. 16, 2020.
(Continued)

*Primary Examiner* — Ryan W Sherwin
(74) *Attorney, Agent, or Firm* — Maschoff Brennan

(57) ABSTRACT

A method may include receiving data from one or more sensing elements associated with a power tool. The method may also include measuring the detected data. The method may further include computing one or more data parameters based on the measuring. The method may include determining whether to permit operation of the power tool based on the data parameters. The method may further include permitting operation of the power tool when the data parameters satisfy an operation condition. The method may also include altering operation of the power tool when the data parameters does not satisfy the operation condition by performing at least one of: generating an alarm, or preventing operation of the power tool.

23 Claims, 4 Drawing Sheets

(51) Int. Cl.
*G08B 21/18* (2006.01)
*B25B 21/00* (2006.01)

(56) References Cited

U.S. PATENT DOCUMENTS

| | | | |
|---|---|---|---|
| 2003/0146008 A1* | 8/2003 | Andriolo | B25F 5/02 |
| | | | 173/217 |
| 2005/0000998 A1 | 1/2005 | Grazioli et al. | |
| 2006/0285725 A1* | 12/2006 | Recce | B60R 25/042 |
| | | | 382/115 |
| 2007/0016104 A1* | 1/2007 | Jansen | A61B 5/157 |
| | | | 600/583 |
| 2007/0095149 A1 | 5/2007 | Sieber et al. | |
| 2013/0187587 A1 | 7/2013 | Knight et al. | |
| 2013/0327552 A1* | 12/2013 | Lovelass | B25B 23/147 |
| | | | 173/1 |
| 2014/0144664 A1* | 5/2014 | Fuchs | B25F 5/001 |
| | | | 173/216 |
| 2014/0231113 A1* | 8/2014 | Steurer | B25F 5/00 |
| | | | 173/1 |
| 2014/0317722 A1 | 10/2014 | Tartz et al. | |
| 2015/0309640 A1* | 10/2015 | Vuckovic | G06F 3/041 |
| | | | 173/1 |
| 2017/0008159 A1* | 1/2017 | Boeck | G05B 19/00 |
| 2017/0224573 A1* | 8/2017 | Challa | A45B 3/00 |
| 2018/0043521 A1* | 2/2018 | Moessnang | B25F 5/00 |
| 2022/0172911 A1* | 6/2022 | Faraut | H01H 13/807 |

FOREIGN PATENT DOCUMENTS

| | | |
|---|---|---|
| JP | 3988055 B2 | 10/2007 |
| JP | 2009-220213 A | 10/2009 |
| JP | 2013-233636 A | 11/2013 |
| JP | 2013-255987 A | 12/2013 |
| JP | 2015-130167 A | 7/2015 |
| JP | 2015-223638 A | 12/2015 |
| WO | 2016/1740448 A1 | 10/2016 |

OTHER PUBLICATIONS

Japanese Office Action issued in corresponding application No. 2019-556569, dated Dec. 1, 2020.
Japanese Office Action issued in corresponding application No. 2019-556569, dated Aug. 3, 2021.

* cited by examiner

MULTI-MODAL SENSING FOR POWER TOOL USER INTERFACE

FIELD

The embodiments discussed herein are related to multi-modal sensing for power tool user interface.

BACKGROUND

The internet of things (IoT) typically includes a network of physical devices, vehicles, buildings and other items—embedded with electronics, software, sensors, actuators, and network connectivity that enable these objects to collect and exchange data, often without user input. IoT devices are sometimes referred to as smart devices.

The subject matter claimed herein is not limited to embodiments that solve any disadvantages or that operate only in environments such as those described above. Rather, this background is only provided to illustrate one example technology area where at least one embodiment described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Conventional electric power tool user interfaces may include electromechanical and/or purely mechanical switches that are used to determine functional parameters. In an electric power drill, for example, functional parameters may include drilling speed and drilling direction. Some limitations of conventional electromechanical and mechanical switches may include but are not limited to (a) large physical size, volume and weight, (b) limited customization of activation force for different user profiles, and (c) limited fail-safe features in the event of improper or unintended usage. Further, conventional power tools may include electromechanical and mechanical switches that may be bulky and do not allow customization of activation force for different user profiles. Moreover, conventional power tools may include pressure sensing switches that may not provide tactile or haptic feedback. And, conventional power tools may lack real-time monitoring of intended user input, proper usage and physical force sensing feedback.

Aspects of the present disclosure address these and other shortcomings by providing a design and implementation of a scalable multi-modal sensing architecture for a power tool interface. The power tool interface may include customization of activation force for different user profiles. Moreover, the power tool interface may include one or more pressure sensing switches that may provide tactile or haptic feedback. And, the power tool interface may include real-time monitoring of intended user input, proper usage and physical force sensing feedback.

Another feature of the system is the ability to provide real-time network data transmission in the event of a power tool drop, low battery level, or other forms of incorrect usage or state of the power drill. This is particularly useful for work sites that can leverage a network (e.g., an Internet of Things "IoT" network) for enhancing safety and productivity.

A method may include receiving data from one or more sensing elements associated with a power tool. The method may also include measuring the detected data. The method may further include computing one or more data parameters based on the measuring. The method may include determining whether to permit operation of the power tool based on the data parameters. The method may further include permitting operation of the power tool when the data parameters satisfy an operation condition. The method may also include altering operation of the power tool when the data parameters does not satisfy the operation condition by performing at least one of: generating an alarm, or preventing operation of the power tool.

Embodiments of the present disclosure are further described with reference to the accompanying drawings.

Figure 1:
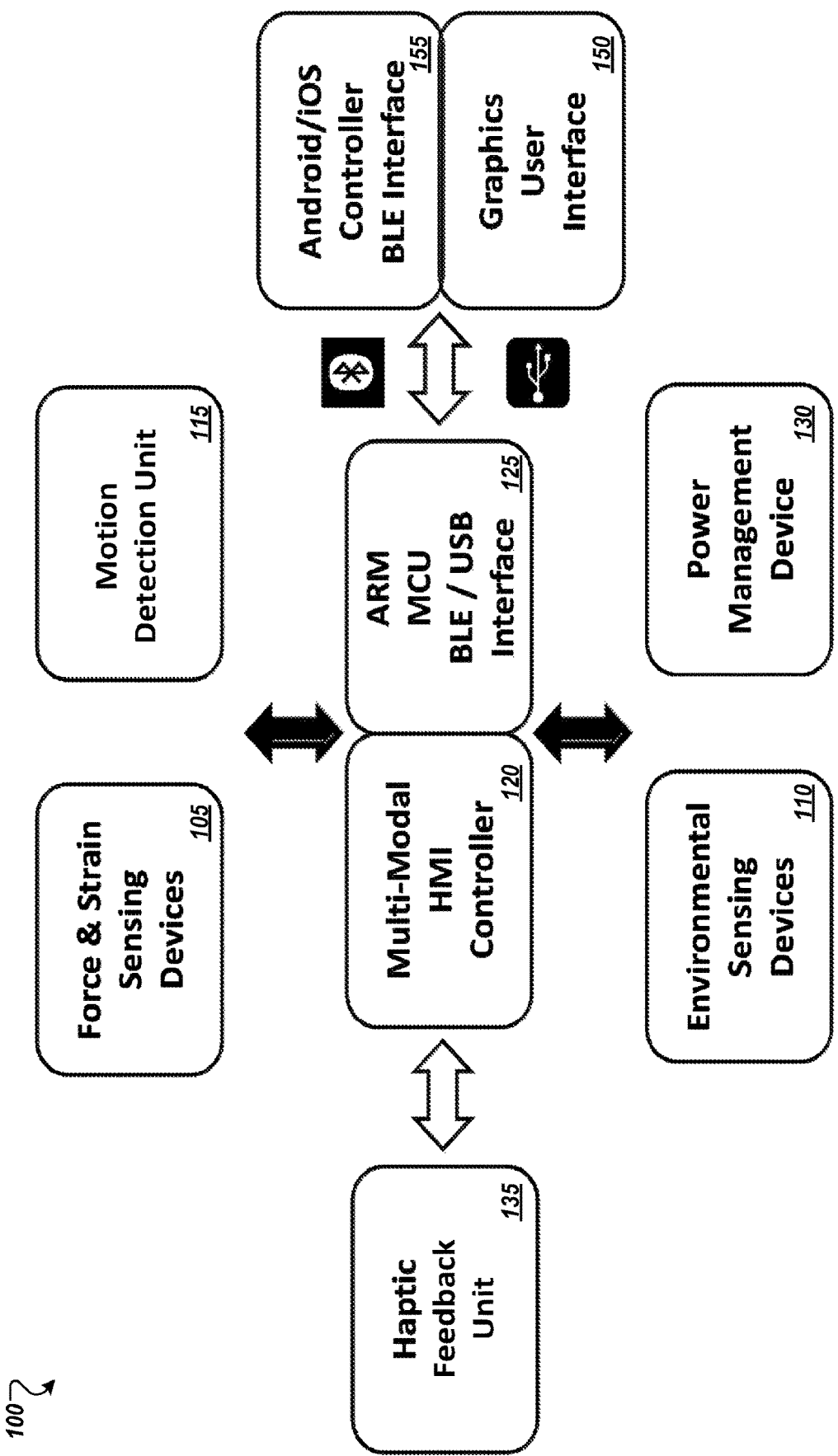
FIG. 1 illustrates an example system diagram of a multi-modal sensor fusion platform for a power tool ("system")

FIG. 1 illustrates an example system diagram of a multi-modal sensor fusion platform for a power tool ("system") 100. The system 100 may include various sensors, haptic devices, controllers, data acquisition devices, signal processing devices, display devices, interfaces, power management devices, etc. The system 100 may include a scalable multi-modal sensing architecture that may provide real-time monitoring of intended user input, proper usage and physical force sensing feedback to determine safe functional operation. In the event of improper usage, functional operation may be stopped and one or more alarms may be generated, such as in the form of visual indicator and real-time network data where applicable.

The system 100 may include one or more strain sensing elements 105 and/or one or more force sensing elements 105. The one or more strain sensing elements 105 may include two-dimensional or three-dimensional strain sensing elements. The one or more force sensing elements may include one or more force/pressure sensors.

Figure 2:
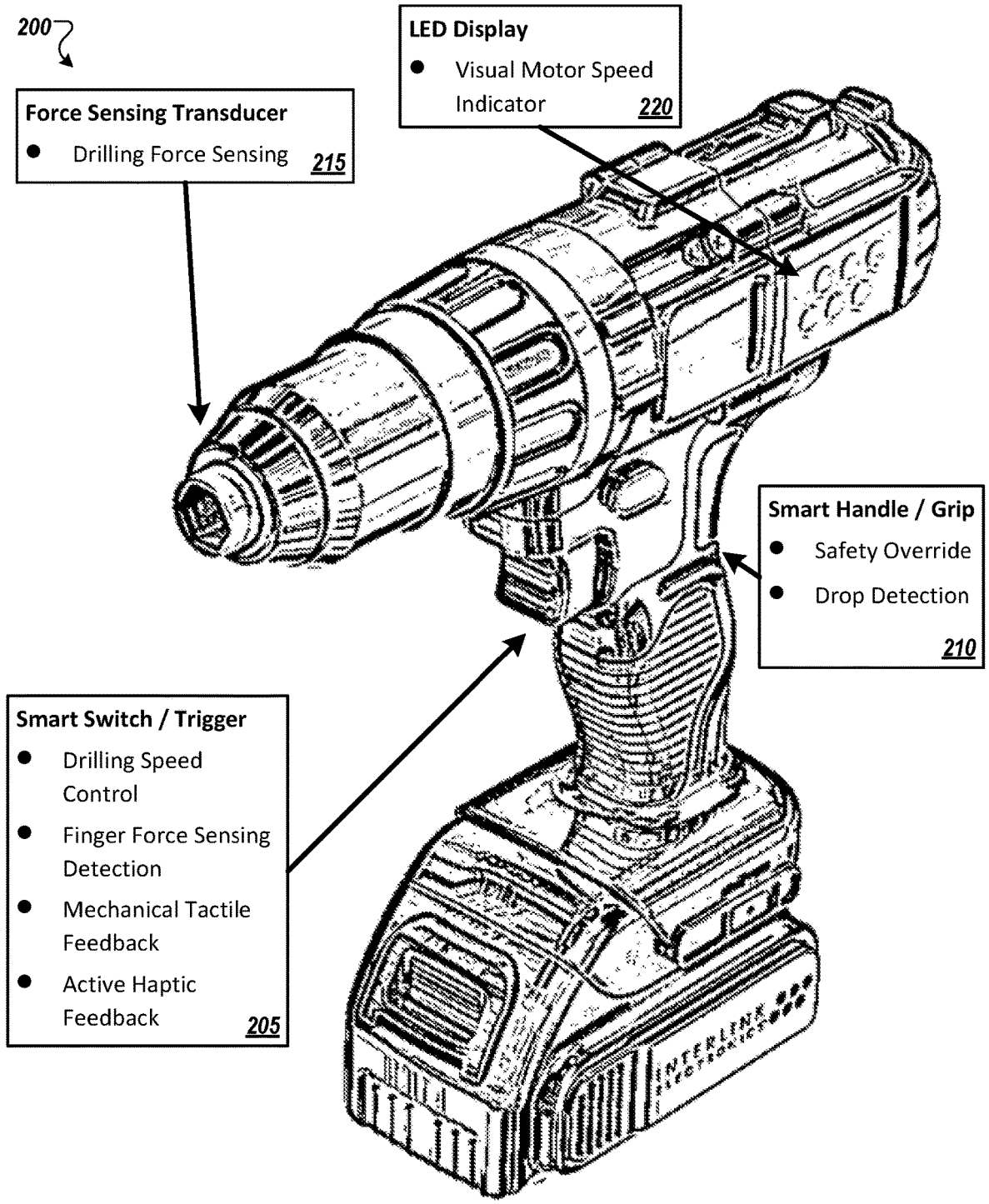
FIG. 2 illustrates an arrangement of an example multi-function power tool.

In at least one embodiment, the system 100 may include or may include a power tool and/or an activation switch or button of a power tool (as illustrated in FIG. 2), which may include one or more force sensing elements 105. The one or more force sensing elements 105 may be configured to detect and/or measure force and/or pressure distribution across some or all of a surface of the activation switch. The activation switch may include one or more strain sensing elements 105. The one or more strain sensing elements 105 may be configured to detect and/or measure bending and/or flexing of the activation switch.

The system 100 may include one or more environmental sensing elements 110. The one or more environmental sensing elements 110 may be configured to detect and/or measure environmental parameters including temperature and humidity. At least some of the environmental parameters may contribute to noise in the system. The environmental parameters may be accounted for and/or mathematically reduced, minimized or ignored to reduce the noise in the system. The integration of more than one type of sensing elements in combination with signal processing algorithms may provide a robust force and pressure mapping and motion measurement solution.

The system 100 may also include and one or more motion sensing elements 115, such as inertial measurement devices, which may be used to extract physiological monitoring parameters. The one or more motion sensing elements may be configured to detect and/or measure movement, changes in movement, motion, inertia, etc. Example motion sensing elements may include an accelerometer, gyroscope, etc. Analysis of the physiological monitoring parameters can be used in a broad range of applications including control of the power tool. Results of data analytics may be shown in the form of quantitative data and charts on a portable device or a remote device.

In at least one embodiment, the system 100 may include a physical stack-up topology of a power tool or an activation switch that may include an interposer, one or more force sensing elements 105, one or more strain sensing elements 105, one or more environmental sensing elements 110, and one or more motion sensing elements 115. The interposer may include an electrical interface routing between a socket or a connection to another. For example, the interposer may connect any of the one or more force sensing elements 105, the one or more strain sensing elements 105, the one or more environmental sensing elements, 110 and/or the one or more motion sensing elements 115 to a host controller 120.

In at least one embodiment, the system 100 may include at least two sensing layers. Each sensing layer may include one or more force sensing elements which may provide dynamic force/pressure detection and measurement within each sensing layer. Each sensing layer may also include one or more strain sensing elements and one or more environmental sensing elements.

In at least one embodiment, the system 100 may include multiple force sensing elements. Each force sensing element may be individually customized for optimal dynamic force/pressure characteristics including but not limited to force/pressure range, rise time, fall time, etc. Each force sensing element may be assigned a specific location with respect to the activation switch, location on the activation switch, and/or a position on a activation switch. Each force sensing element may be individually customized to measure dynamic force/pressure characteristics based on the respective location within or on the activation switch. The system may also include multiple strain sensing elements, which may provide dynamic bending/flexing detection. The system 100 may also include multiple environmental sensing elements which may provide dynamic environmental parameter measurement.

Similarly, in at least one embodiment, the system 100 may include multiple motion sensing elements. Each motion sensing element may be individually customized to detect optimal dynamic motion characteristics. Each motion sensing element may be assigned a specific location within or on the activation switch, location on the activation switch, etc. Each motion sensing element may be individually customized to measure motion characteristics based on the respective location with respect to the activation switch.

In at least one embodiment, the host controller 120 may include a multi-model HMI controller. In at least one embodiment, the host controller 120 may include a processor configured to execute computational processing of dynamic force detection and measurement data from force sensing elements. The processor may use the dynamic force detection and measurement data, for example, to determine a force/pressure map across some or all of an activation switch surface. The processor may also be configured to execute computational processing of dynamic strain detection and measurement data from strain sensing elements. The processor may use the dynamic strain detection and measurement data to determine activation switch flexing characteristics. The processor may also be configured to execute computational processing of dynamic environmental sensing data received from one or more environmental sensing elements. The processor may also use the environmental sensing data to achieve dynamic environmental compensation of force sensing elements and the strain sensing elements. The processor may also be configured to execute computational processing of dynamic motion sensing data received from one or more motion sensing elements. The processor may also use the motion sensing data to achieve dynamic motion compensation of force sensing elements, the strain sensing elements and/or the environmental sensing elements. The host controller may include circuitry configured to receive data from the sensing elements. The host controller may include a memory to store the data and a processor to execute operations.

The embedded host controller may be electronically connected to a client device (not illustrated in FIG. 1) via a communication link 125. In at least one embodiment, the sensor may be coupled to the client device via a wired communication link. The communication link may provide any form of wired or wireless communication capability between the system and any other device. In some embodiments, the communication link may include a radio frequency (RF) antenna. By way of example and not limitation, the communication link may be configured to provide, via wireless mechanisms, LAN connectivity, Bluetooth connectivity, Bluetooth Low Energy (BLE), Wi-Fi connectivity, NFC connectivity, M2M connectivity, D2D connectivity, GSM connectivity, 3G connectivity, 4G connectivity, LTE connectivity, any other suitable communication capability, or any suitable combination thereof. The power tool and/or the activation switch may include any number of communication links. The communication link may provide various interface 155 functionality, such as an Android®/iOS® controller and display module, game engine visualization, various modes (e.g., walking and running modes), a Bluetooth Low Energy Interface, etc.

In at least one embodiment, the host controller 120 (e.g., the processor) may scan the sensing elements (e.g., the force sensing elements 105, strain sensing elements 105, the environmental sensing elements 110, the motion sensing elements 115). The processor may scan the sensing elements periodically. In at least one embodiment, the processor may use a variable scanning rate for at least some of the sensing elements, which may provide a benefit of optimal data resolution and/or power consumption. For example, some areas of the activation switch may move or be moved more frequently, or may experience a greater rate of change in force or pressure as compared to other areas of the activation switch. These areas may be scanned more frequently for higher data resolution. Those areas with lesser rate of change in force or pressure may be scanned less frequently, which may reduce power consumption of the system.

The processor may perform various analyses based on data received from the sensing elements (and from any other sensors, as described herein). For example, the processor may generate a force and/or pressure map of the activation switch. The force and/or pressure map may be an instantaneous snapshot of the current state of the activation switch. The force and/or pressure map may also include data over time and the map may represent average, median, or other values. The map may be used to determine whether the power tool is being held correctly, whether the power tool is being used correctly, etc. The map may be viewable as a "heat map" which may show force or pressure ranges in different colors. In at least one embodiment, the processor may send the sensor data to another device (e.g., a server, a client device) for processing. The processor may also send the sensor data to another portable or wearable device such as smartphone or smartwatch.

The system 100 may include a graphical user interface (GUI) 150 that may display various information, such as a current force value, some or all of the force and/or pressure map, a current state of the activation switch, a battery power level, an indicator of whether the power tool is being held correctly, etc.

The system may also include a power management device 130 which may provide and/or regulate power for the system.

The system may also include a haptic feedback unit 135 that may drive haptic feedback to the system. For example, the embedded controller may receive sensor data from any of the sensors (e.g., the sensing array). Based on the sensor data, the embedded controller may generate and send instructions to the haptic feedback unit 135 to produce a haptic response via the system (e.g., as a haptic feedback via the activation switch that the user may feel). The haptic may be provided via a haptic device via the activation switch that may be felt by the user. Example haptic feedback may include, but are not limited to, a press, a pulse, a shock, a release, all of which may be short, long, or repeated. The haptic feedback may be used to indicate various operation of the power tool. For example, a haptic emission may indicate to the user that the user is holding the power tool correctly and operation of the power tool may begin.

Systems and method described herein may be used in myriad applications, such as with any type of power tool.

FIG. 2 illustrates an arrangement of an example multi-function power tool 200. In an illustrated example of a drilling mode, the power tool 200 may include a smart switch/trigger 205 with an embedded force sensing transducer to determine a finger force sensing input profile. The power tool 200 may also include a smart handle/grip 210 with embedded force sensing transducer(s) and/or inertial measurement unit to determine correct usage, detect power tool drop detection and provide safety override in real-time. The power tool 200 may further include a force sensing transducer 215 to determine a real-time drilling force profile as the power tool 200 is being used to drill a screw, for example.

The power tool 200 may also include a graphical user interface (GUI) 220. As illustrated, the GUI 220 includes one or more light emitting diode (LED) displays to show real-time drilling parameters including drill speed. The example multi-function power tool may include some or all of the components of the system of FIG. 1.

The power tool 200 may include sensing elements that may be configured to measure force, strain, motion, movement, and other environmental characteristics exerted by a person on the activation switch.

The activation switch may be formed from any material or combination of materials. The material may include a porous material, foam material, plastic material, or any other natural or synthetic material. The activation switch may be attached to an interposer, such as by being bonded (e.g., glued, welded, sewed, etc.) to the interposer. In at least one embodiment, the activation switch may be formed from a resilient material configured to withstand repeated impact with a hard surface (e.g., concrete).

The interposer may be connected to an external circuit board as part of the external host controller. The interposer may also include or be part of any type of circuit board. The circuit board may be formed from any material. The circuit board may be rigid or flexible.

One or more sensing elements may be coupled to the interposer. The one or more sensing elements may be referred to as a sensing array. The one or more sensing elements may include one or more force sensing elements, one or more strain sensing elements, one or more motion sensing elements, and/or one or more environmental sensing elements. The one or more strain sensing elements may include one or more two-dimensional strain sensing elements. The sensing elements may be spatially distributed on the interposer. One or more of the sensing elements may be a discrete part that is coupled to the interposer. Alternatively, one or more of the sensing elements may be directly formed, etched, deposited, or printed etc. onto the interposer. For example, a sensing element may be printed on a flexible circuit board (i.e., flex).

The system may also include a controller, as further described in conjunction with FIG. 1. The controller may include circuitry configured to receive data from the sensing elements. The controller may include a memory to store the data and a processor to execute operations. The controller may include a communication link.

The controller may perform various analyses based on data received from the sensing elements (and from any other sensors, as described herein). For example, the controller may generate a force, motion, and/or pressure map of inputs on the activation switch.

The system may include any number of sensors. The sensor may represent any hardware or software sensor capable to detect any characteristic of or near the activation switch (such as data indicative of motion or environment), including but not limited to an accelerometer, gyroscope, altimeter, global positioning system (GPS), pedometer, magnetometer, a thermometer, a humidity sensor, a barometric pressure sensor, a GPS receiver, any other sensor that may detect motion, environmental, or human state, or any combination thereof. Any motion detected by the sensor may be referred to as a motion characteristic. The sensor may detect various motion patterns that may be associated with a particular movement of a human. The sensor may include any suitable system, apparatus, device, or routine capable of detecting or determining one or more of the following: tilt, shake, rotation, swing, and any other motion. In some embodiments, the sensor may be configured to detect or determine a location of in the power tool. For example, the sensor may include a GPS receiver, a Wi-Fi signal detector, a mobile phone communication network signal detector, a Bluetooth beacon detector, an Internet Protocol (IP) address detector or any other system, apparatus, device, or module that may detect or determine a location of the power tool. The location may include one or more labels or designations (e.g., home, work, gym). In some embodiments, the sensor may be an integrated sensor that includes two or more different sensors integrated together. For example, the sensor may be an integrated sensor that combines a three-dimensional (3D) accelerometer, a 3D gyroscope, and a 3D magnetometer.

The power tool 200 may also include any number of activity trackers. An activity tracker may represent any hardware or software sensor or device that may be used to detect characteristics (or data indicative of the characteristics) of a tracked individual who is using the power tool, including but not limited to, a heart rate monitor, a blood pressure monitor, thermometer, moisture sensor, respiration sensor, electrodermal activity sensor, sleep sensor, etc. The activity tracker may be used to identify characteristics of the individual who is using the power tool. In some embodiments, the heart rate monitor may be configured to measure or determine heart rate or indicators of heart rate. For example, the heart rate monitor may include one or more sensors (e.g., a photoresistor or a photodiode or the like) configured to detect a pulse, a skin temperature, etc. of an individual.

In these or other embodiments, the activity tracker may include a heart rate monitor may include one or more systems, apparatuses, devices, or modules configured to determine the heart rate based on the detected indicators. In some embodiments, an occurrence in a life of the particular tracked individual may include a heart rate of the particular tracked individual, a heart rate maintained by the particular tracked individual for a particular amount of time, a heart rate recovery time, etc., which may be determined by the host controller (or by an external computing device) based on data received from one or more heart rate monitors or from other activity trackers or sensors.

The power tool 200 may also include any number of haptic feedback devices that may provide any type of haptic feedback to the user.

Figure 3:
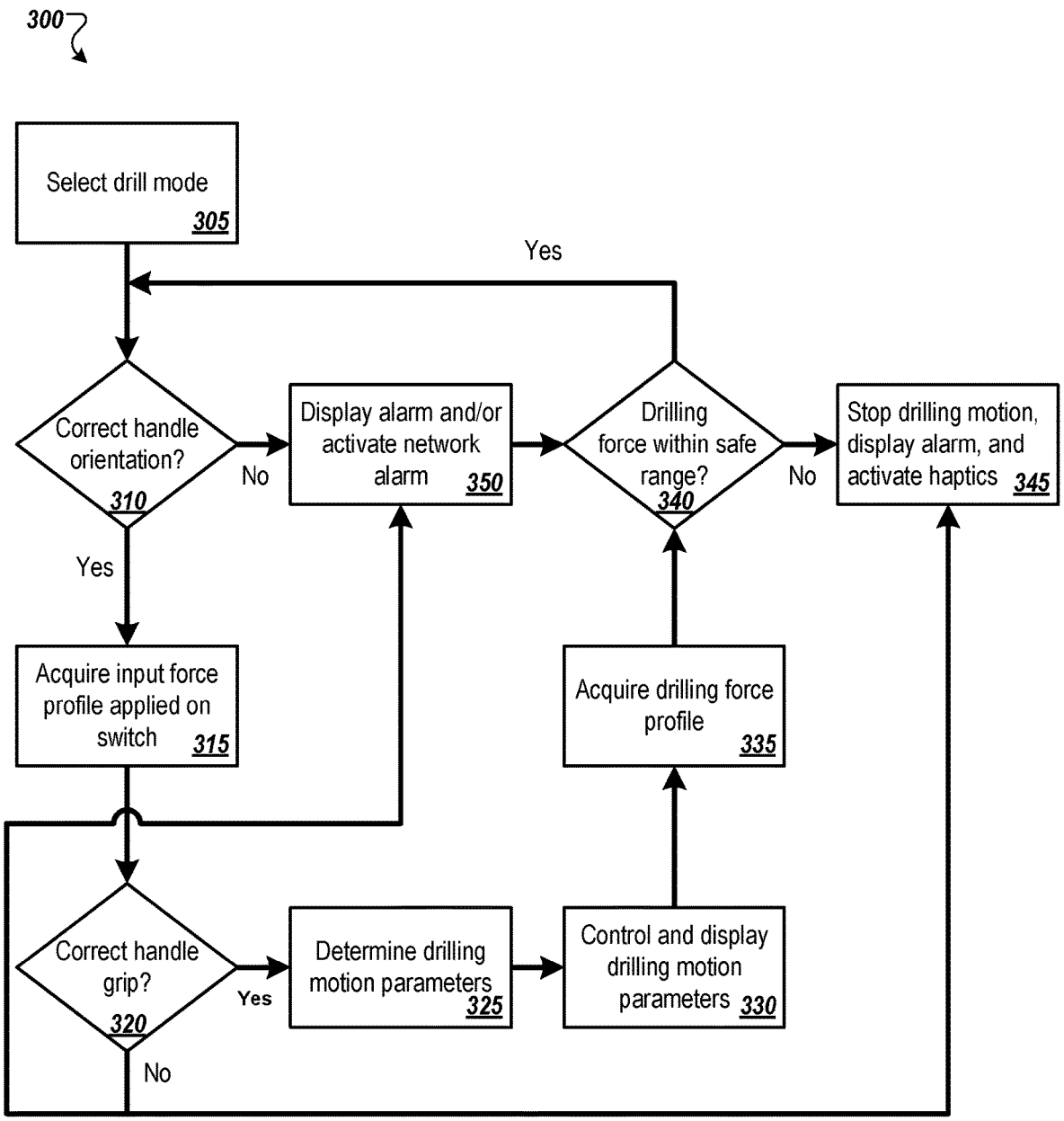
FIG. 3 illustrates an example computational processing flow for multi-modal data acquisition, signal processing and/or control.

FIG. 3 illustrates an example computational processing flow 300 for multi-modal data acquisition, signal processing and/or control. These functions may be obtained by analysis of measurement data from force sensing elements, dimensional strain sensing elements, motion sensing elements, and environmental sensing elements or other sensors or activity trackers.

The processing flow 300 may be performed by processing logic that may include hardware (circuitry, dedicated logic, etc.), software (such as is run on a general purpose computer system or a dedicated machine), or a combination of both, which processing logic may be included in the system 100 and/or power tool 200 of FIG. 1 or 2, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method may begin at block 305 where the processing logic may determine that a drilling mode has been selected for the multi-function power tool.

At block 310, the processing logic may determine whether the power tool is oriented correctly for use. For example, the processing logic may determine whether a smart handle or activation switch is oriented correctly. In at least one embodiment, the processing logic may have access to data indicative of a correct orientation of the power tool. The data may include a sensor data profile, such as a drilling force profile. For example, the processing logic may have data that indicates various sensor readings that indicate correct usage and incorrect usage. "Correct" usage may indicate safety, or optimal usage. For example, correct usage of a paint sprayer may be when a suction tube is positioned to draw paint from a reservoir. An incorrect usage may be when the paint sprayer is upside down, which may not allow paint to flow through the suction tube.

When the processing logic determines that the power tool is in a correct orientation (e.g., "YES" at block 310), the processing logic at block 315 may scan for user activation of the activation switch and correct user gripping of the smart handle. For example, the processing logic may acquire an input force profile on the activation switch.

When the processing logic determines that the power tool is not in a correct orientation (e.g., "NO" at block 310), the processing logic may cause multiple alarms to be generated at block 350. The alarms may be in the form of a visual indicator, an audible indicator, and/or transmitted in real-time over a network to a remote device. At block 320, the processing logic may determine whether the power tool is gripped correctly by a user. For example, the processing logic may determine whether a smart handle or activation switch is being gripped correctly. In at least one embodiment, the processing logic determine via one or more sensors that the smart handle or activation switch is being gripped correctly. For example, the smart handle may include one or more force sensors that correspond with where a user's fingers grip the smart handle. When the processing logic receives data from the one or more force sensors that indicates proper gripping of the smart handle, the processing logic may determine that the power tool is gripped correctly by the user. When the processing logic receives data (or receives no data) from the one or more force sensors that indicates improper gripping of the smart handle, the processing logic may determine that the power tool is not gripped correctly by the user.

When the processing logic determines that the power tool is not gripped correctly by the user ("NO" at block 320), the processing logic may (e.g., a gripping force profile is incorrect or deemed to be unsafe), the processing logic may prevent the power tool from operating, cause the drilling motion to be stopped (e.g., at block 345), and/or cause multiple alarms to be generated (e.g., at block 350). The alarms may be in the form of a visual indicator, an audible indicator, and/or transmitted in real-time over a network to a remote device.

When the processing logic determines that the power tool is gripped correctly by the user ("YES" at block 320), the processing logic may determine operating parameters for the power tool at block 325. For example, the processing logic may determine drilling parameters (e.g., speed and direction) for a power drill. At block 330, the processing logic may control and/or display motion parameters during operation of the power tool.

At block 335, the processing logic may acquire an operating profile, such as during operation of the power tool. The processing logic may acquire the operating profile (or data that contributes to the operating profile) from any of the sensors or sensing elements described herein. The operating profile may include orientation, motion, speed, force, environment, etc. of the power tool. The operating profile may also include gripping characteristics of user on the power tool.

At block 340, the processing logic may determine, based on the operating profile, whether the power tool remains in a safe or operational range. For example, when a paint sprayer it tilted during operation to an orientation that does not easily permit paint to flow through the suction tube, the processing logic may determine that the power tool is not in a recommended operational range. In another example, when the processing logic determines that one or more fingers of a user are no longer gripping the power tool, the processing logic may determine that the power tool may be unsafe to operate. When the power tool is not in a safe or operational range, the processing logic may either generate a warning and/or cause the power tool to stop operating.

The same or similar process flow may be applied when a nailing mode has been selected on a power tool. In this mode, nailing may be performed if the nailing tool is correctly pressed against a solid wall. If the power tool is dropped, drop detection logic may automatically provide operation "shut-down" to prevent potentially accidental triggering of nailing operation.

Figure 4:
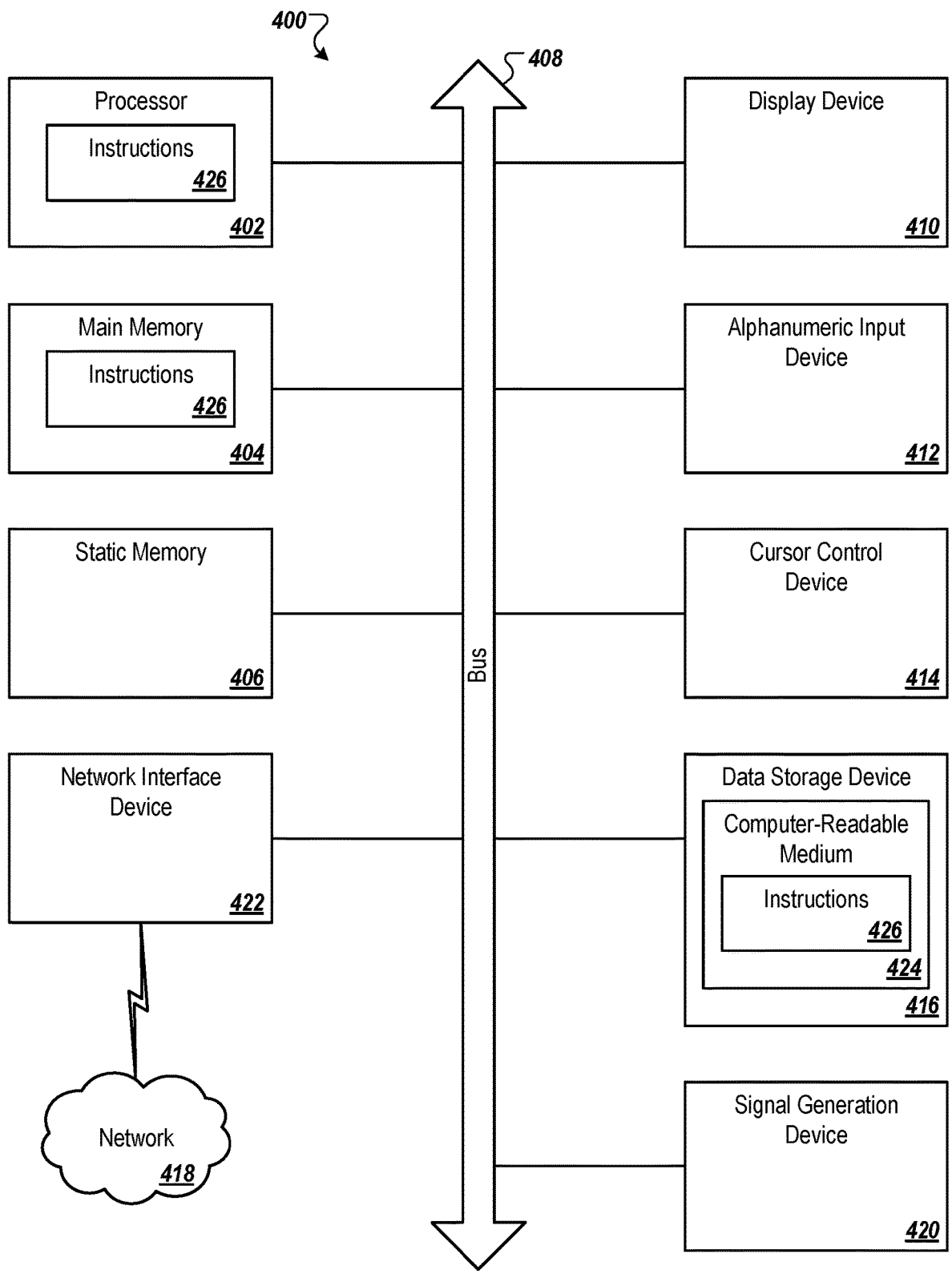
FIG. 4 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 4 illustrates a block diagram of an example computer system 400 related to a multi-modal array, according to at least one embodiment of the present disclosure. The host controller described above may be implemented as a computing system such as the example computer system 400. The computer system 400 may be configured to implement one or more operations of the present disclosure.

The computer system 400 executes one or more sets of instructions 426 that cause the machine to perform any one or more of the methods discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methods discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions for performing the operations and steps discussed herein.

The computer system 400 may further include a network interface device 422 that provides communication with other machines over a network 418, such as a local area network (LAN), an intranet, an extranet, or the Internet. The network interface device 422 may include any number of physical or logical interfaces. The network interface device 422 may include any device, system, component, or collection of components configured to allow or facilitate communication between network components in a network. For example, the network interface device 422 may include, without limitation, a modem, a network card (wireless or wired), an infrared communication device, an optical communication device, a wireless communication device (such as an antenna), and/or chipset (such as a Bluetooth device, an 802.xx device (e.g. Metropolitan Area Network (MAN)), a WiFi device, a WiMax device, cellular communication facilities, etc.), and/or the like. The network interface device 422 may permit data to be exchanged with a network (such as a cellular network, a WiFi network, a MAN, an optical network, etc., to name a few examples) and/or any other devices described in the present disclosure, including remote devices. In at least one embodiment, the network interface device 422 may be logical distinctions on a single physical component, for example, multiple communication streams across a single physical cable or optical signal.

The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 embodying any one or more of the methods or functions described herein. The sets of instructions 426 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" may include a single medium or multiple media (e.g., a centralized or distributed database, and/or associated caches and servers) that store the sets of instructions 426. The term "computer-readable storage medium" may include any medium that is capable of storing, encoding or carrying a set of instructions for execution by the machine and that cause the machine to perform any one or more of the methods of the present disclosure. The term "computer-readable storage medium" may include, but not be limited to, solid-state memories, optical media, and magnetic media.

Modifications, additions, or omissions may be made to the computer system 400 without departing from the scope of the present disclosure. For example, in at least one embodiment, the computer system 400 may include any number of other components that may not be explicitly illustrated or described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In at least one embodiment, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations may be made hereto without departing from the spirit and scope of the present disclosure.

What is claimed is:

1. A method, comprising:
   obtaining data from one or more hardware sensing elements associated with a power tool, the one or more hardware sensing elements comprising at least one pressure sensor;
   computing one or more data parameters based on the data, one of the data parameters including a first force profile that indicates a user grip on the power tool;
   permitting operation of the power tool in response to the data parameters, including the one of the data parameters, satisfying an operation condition;
   determining a second force profile applied to an activation switch of the power tool;
   when operation of the power tool is permitted, activating operation of the power tool in response to the second force profile satisfying an activation force associated with a selected user profile of a plurality of user profiles associated with the power tool, wherein at least two of the plurality of user profiles include different activation forces;
   detecting a change in the data received from the one or more hardware sensing elements;
   computing one or more updated data parameters based on the change in the data received from the one or more hardware sensing elements; and
   altering operation of the power tool in response to the updated data parameters not satisfying the operation condition.

2. The method of claim 1, wherein the data received from the one or more hardware sensing elements associated with the power tool includes environmental data describing an environmental surrounding the power tool, wherein the environmental data is used to compute the one or more data parameters.

3. The method of claim 2, wherein the updated data parameter describes the user grip on the power tool or a spatial orientation of the power tool.

4. The method of claim 1, wherein operation of the power tool is activated in response to the first force profile indicating proper gripping of the power tool.

5. The method of claim 4, wherein the first force profile indicates proper gripping of the power tool based on sensing gripping with respect to each finger of a hand of the user.

6. The method of claim 1 further comprising generating a haptic feedback signal based on the first force profile indicating proper gripping of the power tool.

7. The method of claim 1, wherein the data received from the one or more hardware sensing elements associated with the power tool includes a current spatial orientation of the power tool.

8. The method of claim 1, further comprising sending an alert to a remote device over a network in response to the updated data parameters not satisfying the operation condition.

9. The method of claim 1, wherein detecting the change in the data received from the one or more hardware sensing elements includes detecting a change in the first force profile, the change in the first force profile indicative of an improper grip on the power tool.

10. A non-transitory computer-readable medium having encoded therein programming code executable by a processor to perform operations comprising:
    obtaining data from one or more hardware sensing elements associated with a power tool, the one or more hardware sensing elements comprising at least one pressure sensor;

computing one or more data parameters based on the data, one of the data parameters including a first force profile that indicates a user grip on the power tool;

permitting operation of the power tool in response to the data parameters including the one of the data parameters, satisfying an operation condition;

determining a second force profile applied to an activation switch of the power tool;

when operation of the power tool is permitted, activating operation of the power tool in response to the second force profile satisfying an activation force associated with a selected user profile of a plurality of user profiles associated with the power tool, wherein at least two of the plurality of user profiles include different activation forces;

detecting a change in the data received from the one or more hardware sensing elements;

computing one or more updated data parameters based on the change in the data, including the change in the data indicative of motion of the power tool, received from the one or more hardware sensing elements; and altering operation of the power tool in response to the updated data parameters not satisfying the operation condition.

11. The non-transitory computer-readable medium of claim 10, wherein the data received from the one or more hardware sensing elements associated with the power tool includes environmental data describing an environmental surrounding the power tool, wherein the environmental data is used to compute the one or more data parameters.

12. The non-transitory computer-readable medium of claim 10, wherein the updated data parameter describes the user grip on the power tool or a spatial orientation of the power tool.

13. The non-transitory computer-readable medium of claim 10, wherein operation of the power tool is activated in response to the first force profile indicating proper gripping of the power tool.

14. The non-transitory computer-readable medium of claim 10, further comprising generating a haptic feedback signal based on the first force profile indicating proper gripping of the power tool.

15. The non-transitory computer-readable medium of claim 10, wherein the data received from the one or more hardware sensing elements associated with the power tool includes a current spatial orientation of the power tool.

16. The non-transitory computer-readable medium of claim 10, further comprising send an alert to at least one remote device in real-time over a network in view of the change in the data.

17. A system, comprising:
a memory storing instructions; and
a processing device operatively coupled to the memory, the processing device being configured to execute the instructions to cause the system to perform operations comprising:
  obtain data from one or more sensing elements associated with a power tool, the one or more sensing elements comprising at least one pressure sensor;
  compute one or more data parameters based on the data, one of the data parameters including a first force profile that indicates a user grip on the power tool;
  permit operation of the power tool in response to the data parameters including the one of the data parameters, satisfying an operation condition;
  determine a second force profile applied to an activation switch of the power tool;
  when operation of the power tool is permitted, activate operation of the power tool in response to the second force profile satisfying an activation force associated with a selected user profile of a plurality of user profiles associated with the power tool, wherein at least two of the plurality of user profiles include different activation forces;
  detect a change in the data received from the one or more sensing elements;
  compute one or more updated data parameters based on the change in the data received from the one or more sensing elements; and
  alter operation of the power tool in response to the updated data parameters not satisfying the operation condition.

18. The system of claim 17, wherein the data received from the one or more sensing elements associated with the power tool includes environmental data describing an environmental surrounding the power tool, wherein the environmental data is used to compute the one or more data parameters.

19. The system of claim 17, wherein the updated data parameter describes the user grip on the power tool or a spatial orientation of the power tool.

20. The system of claim 17, wherein operation of the power tool is activated in response to the first force profile indicating proper gripping of the power tool.

21. The system of claim 17, further comprising wherein the operations further comprise generate a haptic feedback signal based on the first force profile indicating proper gripping of the power tool.

22. The system of claim 17, wherein the data received from the one or more sensing elements associated with the power tool includes a current spatial orientation of the power tool.

23. The system of claim 17, further comprising send an alert to at least one remote device in real-time over a network in view of the change in the data.

* * * * *